(12) United States Patent
Geislinger et al.

(10) Patent No.: US 9,651,095 B2
(45) Date of Patent: May 16, 2017

(54) COUPLING (71) Applicant: Ellergon Antriebstechnik Gesellschaft m.b.H., Hallwang (AT)

(72) Inventors: Matthias Geislinger, Hallwang (AT); Cornelius Geislinger, Hallwang (AT); Andreas Brandstätter, Hallwang (AT)

(73) Assignee: Ellergon Antriebstechnik Gesellschaft m.b.H, Hallwang (AT)

( * ) Notice: Subject to any disclaimer, the term of this patent is extended or adjusted under 35 U.S.C. 154(b) by 0 days.

(21) Appl. No.: 14/835,896

(22) Filed: Aug. 26, 2015

(65) Prior Publication Data
US 2016/0061271 A1    Mar. 3, 2016

(30) Foreign Application Priority Data

Aug. 26, 2014 (EP) .................................... 14182332

(51) Int. Cl.
*F16D 3/74* (2006.01)
*F16D 3/00* (2006.01)
(Continued)

(52) U.S. Cl.
CPC ............... *F16D 3/005* (2013.01); *F16D 3/04* (2013.01); *F16D 3/06* (2013.01); *F16D 3/74* (2013.01);
(Continued)

(58) Field of Classification Search
CPC ... F16D 3/005; F16D 3/04; F16D 3/06; F16D 3/74; F16D 2003/745; Y10T 29/49877; Y10T 464/10
(Continued)

(56) References Cited

U.S. PATENT DOCUMENTS 1,639,481 A    8/1927    Baumann
1,664,052 A    3/1928    Ungar
(Continued)

FOREIGN PATENT DOCUMENTS

EP    0856674 A1    8/1998
FR    2872234 A1    12/2005
(Continued)

OTHER PUBLICATIONS

European Search Report issued for corresponding European Patent Application EP14182332.8 mailed Feb. 17, 2015.

*Primary Examiner* — Gregory Binda
(74) *Attorney, Agent, or Firm* — Myers Wolin, LLC (57) ABSTRACT

A displacement compensating coupling comprises a first coupling member, a second coupling member and connecting elements for connecting the coupling members. The coupling members are each made in one piece from composite material and have a first flange portion for attachment to one of the drive elements, a diaphragm portion that extends radially outwardly from the first flange portion, a second flange portion and a tube portion extending from an outer circumference of the diaphragm portion to the second flange portion. Each of the tube portions has two or more recesses that are spaced from each other in circumferential direction. In a first relative position of the coupling members, the recesses of the first coupling member face the recesses of the second coupling member, and in a second relative position the recesses of the first coupling member and of the second coupling member are offset in circumferential direction.

19 Claims, 6 Drawing Sheets (51) Int. Cl.
*F16D 3/04* (2006.01)
*F16D 3/06* (2006.01)
(52) U.S. Cl.
CPC ... *F16D 2003/745* (2013.01); *Y10T 29/49877* (2015.01)
(58) Field of Classification Search
USPC ................ 464/17, 79, 80, 88, 177; 403/223; 29/454; 92/45
See application file for complete search history.

(56) References Cited

U.S. PATENT DOCUMENTS

| | | | | |
|---|---|---|---|---|
| 2,901,897 A | * | 9/1959 | Reich | F16D 3/72 464/79 X |
| 2,934,367 A | * | 4/1960 | Gaubatz | F16F 15/02 403/223 X |
| 3,577,621 A | * | 5/1971 | De Gain | B21D 15/06 29/454 |
| 6,095,924 A | | 8/2000 | Geislinger | |
| 2006/0003847 A1 | | 1/2006 | Mermoz | |

FOREIGN PATENT DOCUMENTS

| | | | |
|---|---|---|---|
| GB | 208008 A | | 12/1923 |
| GB | 519773 | * | 4/1940 |
| WO | 2013044425 A1 | | 4/2013 |

* cited by examiner

COUPLING

CROSS REFERENCE TO RELATED APPLICATIONS

This application claims priority under 35 USC §119 to European Patent Application No. EP 14182332.8, filed on Aug. 26, 2015, the contents of which are incorporated herein by reference.

FIELD OF THE INVENTION

The present invention relates to the field of displacement compensating couplings made of fibre composite material.

BACKGROUND

More specifically, the present invention relates to a coupling comprising a first coupling member made in one piece from composite material and having a first flange portion for attachment to a first drive element, a diaphragm portion that extends radially outwardly from the first flange portion, a second flange portion and a tube portion extending from an outer circumference of the diaphragm portion to the second flange portion, a second coupling member made in one piece from composite material and having a first flange portion for attachment to a second drive element, a diaphragm portion that extends radially outwardly from the first flange portion, a second flange portion and a tube portion extending from an outer circumference of the diaphragm portion to the second flange portion, and connecting elements connecting the first coupling member and the second coupling member at their second flange portions.

Couplings of this type allow for compensation of angular, radial and axial displacements that may occur between the axes of rotation of drive elements of a drive shaft. At least two diaphragms that are spaced apart from each other in axial direction are used for compensating angular and/or larger radial displacements. During rotation of the drive shaft the diaphragm portions of the coupling members deform elastically thereby providing the desired effect. Typical applications of such compensating couplings include drive trains of ships and the like where the coupling is arranged in a drive shaft between an engine and a gearbox. Such applications are characterised by limited axial space. Specifically, it is often impossible or extremely complicated and thus expensive to remove the engine or gearbox or even parts thereof for mounting or dismounting the coupling between them.

U.S. Pat. No. 6,095,924 A discloses a coupling of the type mentioned above addressing these issues. In particular, it is possible to mount the coupling between the drive elements without changing the position of the latter. That is, the coupling can be easily inserted in or removed from an installation space between the engine and the gearbox. During assembly the first coupling member is attached to the first drive element by connecting the first flange portion of the first coupling member to the first drive element. Due to the absence of the second coupling member at that stage the first flange portion can be bolted to a flange of the first drive element from the side of the first coupling member that will later be covered by the second coupling member. Thus, it is possible to arrange the diaphragm portion very close to a structure receiving or supporting the first drive element. Subsequently, the second coupling member is inserted between the first coupling member and the second drive element. Since the first flange of the second element is shielded by the tube portions of the coupling, it can be bolted to a flange of the second drive element only from the rear side of the latter. In order to access the corresponding bolts for mounting and dismounting them sufficient space must be provided between the rear of the flange of the second drive element and a corresponding housing or supporting structure. This reduces the axial distance between the diaphragm portions of the first and second coupling members and thus the possible range for compensating displacements between the axes of rotation of the first and second drive elements.

Another coupling having coupling members made from vulcanized fabric layers is known from U.S. Pat. No. 1,664,052. The coupling members have flexible portions of skeleton or spider form and are connected between drive elements in a conventional manner from the outside so that the distance between the flexible portions remains small.

The present invention aims at improving the compensation potential of the coupling in relation to its axial length without impairing torque transmission or increasing materials usage.

SUMMARY

This technical problem is solved by a coupling as defined in the claims. In particular, the invention provides a coupling comprising a first coupling member made in one piece from composite material and having a first flange portion for attachment to a first drive element, a diaphragm portion that extends radially outwardly from the first flange portion, a second flange portion and a tube portion extending from an outer circumference of the diaphragm portion to the second flange portion, a second coupling member made in one piece from composite material and having a first flange portion for attachment to a second drive element, a diaphragm portion that extends radially outwardly from the first flange portion, a second flange portion and a tube portion extending from an outer circumference of the diaphragm portion to the second flange portion, and connecting elements connecting the first coupling member and the second coupling member at their second flange portions, wherein each of the tube portions has two or more recesses that are spaced from each other in circumferential direction by non-recessed portions, wherein the recesses are arranged in such manner that in a first relative position of the first coupling member and the second coupling member the recesses of the first coupling member face the recesses of the second coupling member so as to form together apertures for access to an interior of the coupling, and in a second relative position the recesses of the first coupling member and of the second coupling member are offset in circumferential direction and face the non-recessed portions, respectively.

As compared to U.S. Pat. No. 6,095,924 A, a coupling according to the present invention will have a shorter axial length while providing at least the same compensation potential and level of torque transmission.

When the recesses of both coupling members are aligned with each other during assembly, they form apertures through which connecting elements as well as fitting tools can be inserted and handled for connecting the first flange of the second coupling member to the second drive element. Accordingly, no extra space for assembly at the rear of the corresponding flange of the second drive element will be required any longer. This allows for a reduction of the required installation space between the housing or supporting structures of the drive elements and/or the use of a longer coupling with increased displacement compensation potential. Generally, an inventive coupling will have a better ratio of compensation potential to axial length.

Despite the recesses the inventive coupling exhibits high torsional stiffness without increasing material usage since in the operational mode of the coupling the recesses of the two coupling members are offset in circumferential direction against each other so as to face non-recessed portions. The offset in circumferential direction also ensures high buckling safety and reduces mechanical stresses in particular in the tube portions of the coupling members.

In a preferred embodiment the second flange portions extend radially outwardly from the tube portions and are interrupted by the recesses in circumferential direction. The second flange member can be connected easily from outside after the coupling members haven been fastened to the drive elements while the interruptions of the second flange portions enhance access to the interior of the coupling in the first relative position. The parts of the second flange portions at the non-recessed portions enhance torsional stiffness and buckling safety of the coupling.

The recesses on the first coupling member may extend between neighboring coupling members, respectively, and are each bridged by a non-recessed portion on the second coupling member, which extends between the corresponding neighboring connecting elements. Accordingly, torque flow predominantly runs along the non-recessed portions thereby avoiding excessive loads and buckling at the recesses.

The first and second coupling members can be identical in shape as regards at least the diaphragm portion, the tube portion and the second flange portion. They may as well be symmetric to each other to reduce production costs.

In another preferred embodiment the recesses on the first coupling member and on the second coupling member are arranged in equal patterns, said patterns being circumferentially offset in an operational mode of the coupling to secure high buckling safety and torsional stiffness.

Further, the tube portions may be formed with bulges that bulge inwardly or outwardly. The recesses are arranged at the bulges, respectively, to further increase buckling safety.

In yet another preferred embodiment the recesses of one of the first and second coupling members open axially towards to the other of the first and second coupling members and vice versa. The recesses may have circumferential edge portions that are inclined to the circumferential direction at an inclination angle, said inclination angle having an absolute value within a range of 40° to 50° to reduce shear stresses around the recesses.

Further, with a view to torsional stiffness and torque transmission the second flange portions may have a larger wall thickness than the tube portions. This may also facilitate connection of the two flanges by connecting elements such as nuts and bolts.

Preferably, the inventive coupling is implemented in a drive shaft comprising two drive elements that are drivingly connected by the coupling.

The pattern of recesses and non-recesses portions on the coupling members allows for a fast and simple method of mounting a coupling in a limited space between a first drive element and a second drive element, said method comprising: attaching the first coupling member to the first drive element by connecting the first flange portion of the first coupling member to the first drive element through access from the side of the first coupling member, which faces the second drive element, inserting the second coupling member between the first coupling member and the second drive element so that the recesses of the first coupling member and the second coupling member face each other, attaching the second coupling member to the second drive element by accessing the first flange of the second coupling member via the apertures formed by opposite recesses of the first and second coupling member and connecting the first flange portion of the second coupling member to the second drive element, rotating the first and second drive elements relative to each other to offset the recesses in circumferential direction and subsequently connecting the second flange portions of the first and second coupling members with each other.

The coupling can be mounted and dismounted between stationary structures of a drive train without the need of relocating the latter. In other words, the position of the drive elements and related housing and support structures may remain stationary. During assembly merely the drive elements will have to be rotated relative to each other by less than one revolution for misaligning the oppositely positioned recesses before the second flange portions are connected with each other.

BRIEF DESCRIPTION OF THE DRAWINGS

The invention will be described in greater detail hereinafter with reference to the accompanying drawings, in which.

DETAILED DESCRIPTION OF THE PREFERRED EMBODIMENTS

The embodiment shows a coupling 1 for arrangement in a drive train. The coupling 1 is configured to connect a first drive element 2 and a second drive element 3 of the drive train to compensate angular, radial and axial displacements between the drive elements 2, 3. The drive elements 2 and 3 may be configured as flanges as shown but may as well have another shape.

Figure 1:
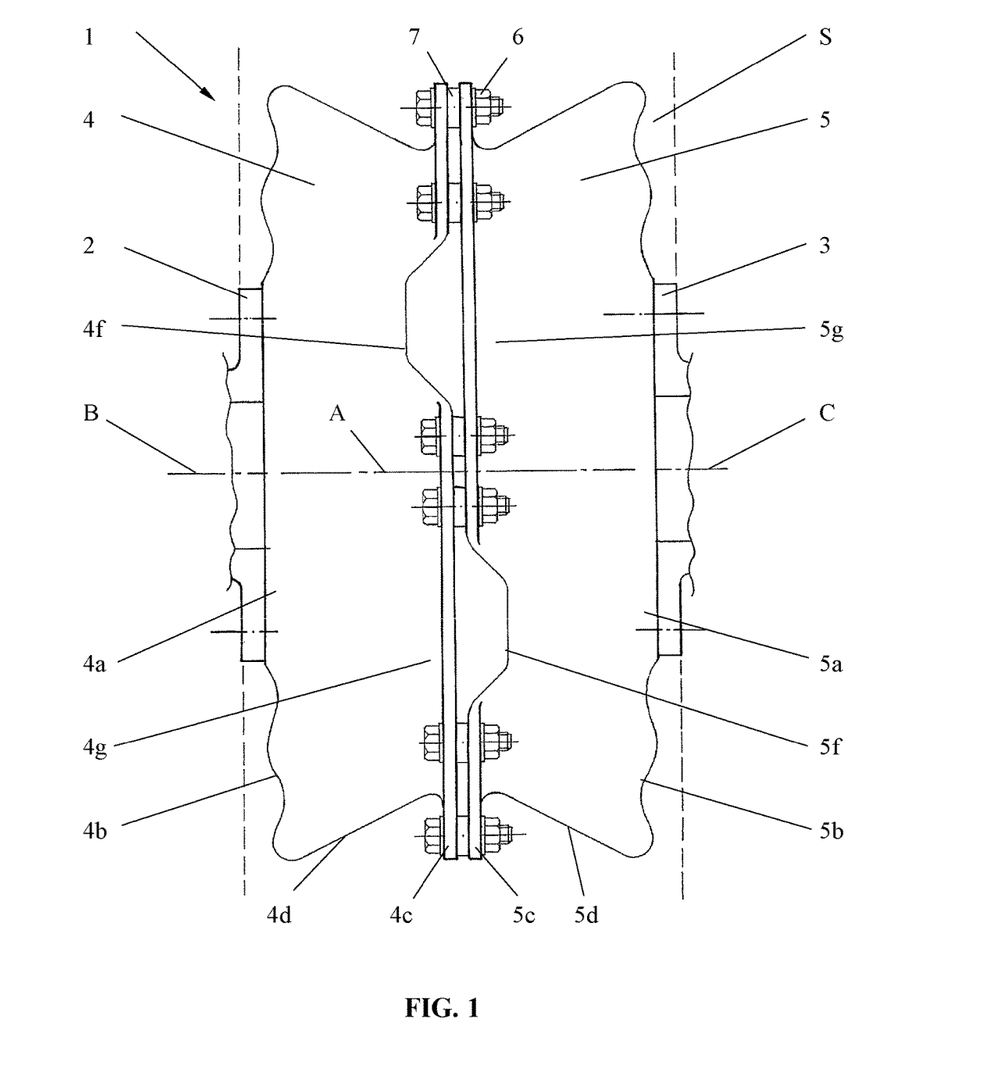
FIG. 1 is a side view of an embodiment of a coupling according to the present invention.

Broken lines in FIG. 1 define the limitation of an installation space S between supporting structures of the drive elements 2 and 3. The supporting structures may for example be parts of housings of an engine and a gearbox in a ship. The coupling 1 may as well be implemented in drive trains that serve other purposes. Essentially, a drive shaft in the sense of the present invention comprises at least the two drive elements 2, 3 and the coupling 1 drivingly connecting the two drive elements 2 and 3.

The coupling 1 comprises a first coupling member 4 for attachment to the first drive element 2, a second coupling member 5 for attachment to the second drive element 3 and connecting elements 6 for connecting the first and second coupling members 4, 5 with each other. The connecting elements 6 are shown as bolts 6a and nuts 6b but other connecting elements can be used instead.

Further, spacers 7 may be arranged between the coupling member 4 and 5 and the connecting elements 6 may pass through these spacers 7.

The first coupling member 4 is made in one piece from composite material including in particular carbon fibre reinforced plastics, glass fibre reinforced plastics and combinations thereof. In the same way, the second coupling member 5 is made in one piece from such composite material.

Each of the first and second coupling members 4 and 5 has a first flange portion 4a, 5a for attachment to the corresponding drive element 2, 3, a diaphragm portion 4b, 5b that extends radially outwardly from the first flange portion 4a, 5a, a second flange portion 4c, 5c, and a tube portion 4d, 5d extending from an outer circumference of the diaphragm portion 4b, 5b to the second flange portion 4c, 5c. The tube portions 4d, 5d are arranged concentrically about an axis of rotation A of the coupling 1.

Figure 2:
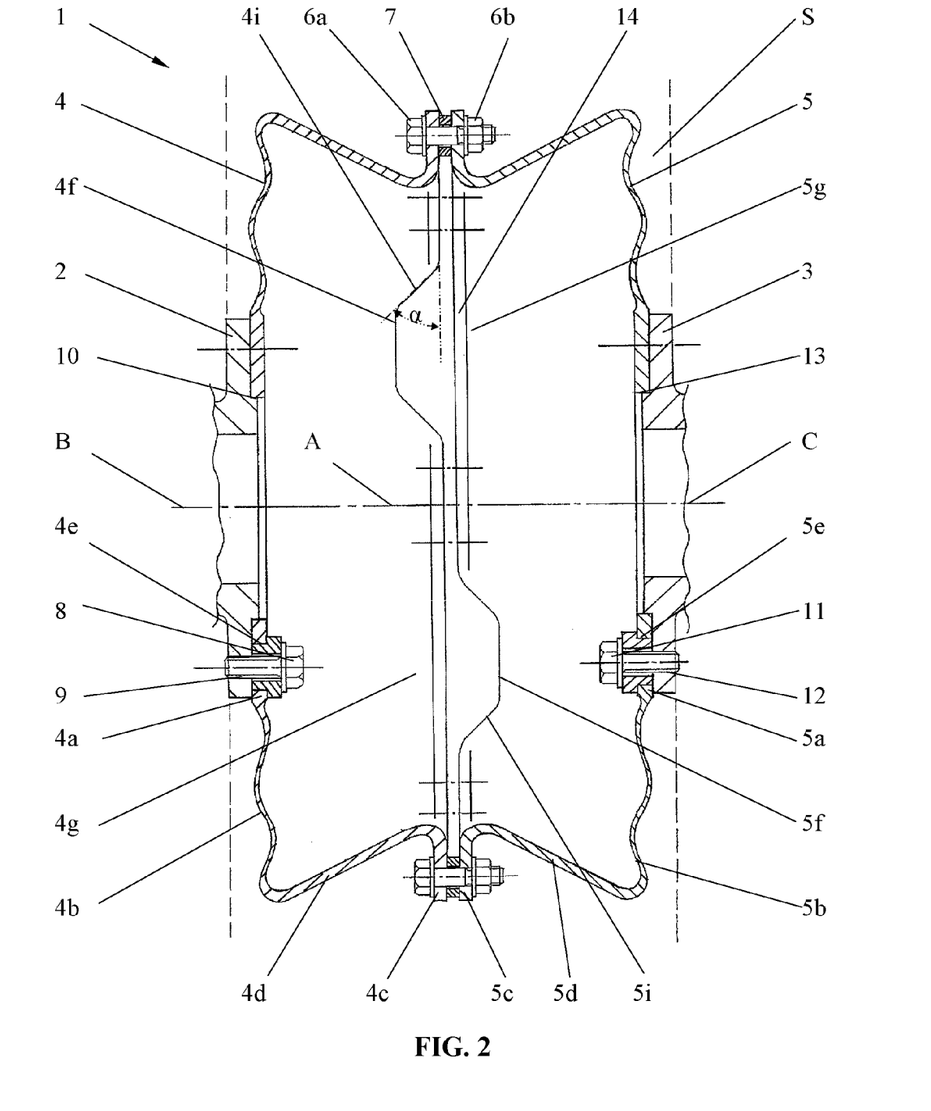
FIG. 2 is a sectional view of the coupling.

Each of the first flange portions 4a, 5a extends substantially in vertical direction and is provided with a plurality of openings 4e, 5e for connecting the first flanges 4a, 5a with the drive elements 2 and 3. FIG. 2 shows a bolt 8 that extends through one of the openings 4e and is screwed from an interior 14 of the coupling 1 into a screw hole 9 at the first drive element 2 to thereby attach the first flange portion 4a and thus the first coupling member 4 to the first drive element 2. The first drive element 2 may be provided with a recess 10 for centering the axis of rotation A of the coupling 1 and the axis of rotation B of the first drive element 2 against each other.

Similarly, the first flange 5a of the second coupling member 5 is attached to the second drive element 3. FIG. 2 shows a corresponding bolt 11 that passes through the opening 5e of the first flange 5a of the second coupling member 5 and that is screwed from the interior 14 of the coupling 1 into a screw hole 12 at the second drive element 3. The second drive element 3 may be provided with a recess 13 for centering the axis of rotation A of the coupling 1 and the axis of rotation C of the second drive element 3 against each other.

Though not necessary, the first and second coupling members 4 and 5 may be symmetric to each other in a first relative position. Further, the first and second coupling members 4, 5 may be identical in shape as regards at least the diaphragm portions 4b, 5b, the tube portions 4d, 5d and the second flange portions 4c, 5c.

Any angular misalignment or axial or radial displacement of the axes of rotation B and C of the first and second coupling members 4, 5 is compensated by the elasticity of the diaphragm portions 4b, 5b. The diaphragm portions 4b, 5b are annular and extend in a radial plane. The diaphragm portions 4b, 5b are preferably uninterrupted, i.e. free of any openings, cut outs and the like. The diaphragm portions 4b, 5b may be corrugated in shape and it is desirable to arrange them as close as possible to the axial ends of the installation space S. A large distance between the diaphragm portions 4b, 5b enhances the compensation potential of the coupling 1.

Figure 5:
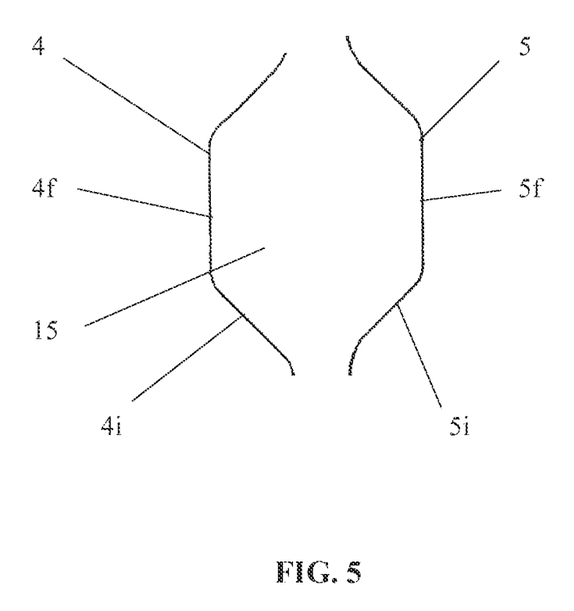
FIG. 5 shows an aperture formed by alignment of a recess on the first coupling member and a recess on the second coupling member.

In order to lengthen this distance each of the tube portions 4d, 5d has two or more recesses 4f, 5f that are spaced from each other in circumferential direction by non-recessed portions 4g, 5g. As clearly shown in FIGS. 1 and 2, these recesses 4f, 5f are remote from the diaphragm portions 4b, 5b. In other words, the recesses 4f, 5f do not impair the compensating function of the diaphragm portions 4b, 5b. In other words, the recesses 4f, 5f are arranged in the non-flexible part of the coupling members 4, 5, i.e. at the tube portion 4d, 5d. They do not extend into the flexible part of the coupling members 4, 5, i.e. the diaphragm portions 4b, 5b. "Non-flexible" is to be understood as being significantly less flexible than the elastic diaphragm portions. The recesses 4f, 5f are preferably limited to a maximum of 50% of the axial length of the tube portions 4d, 5d, respectively. The tube portions 4d, 5d are arranged coaxially around the axis of rotation A and may have a cylindrical or conical shape. They may be inclined towards the second flange portions 4c, 5c so as to merge into the second flange portions 4c, 5c at their smallest diameters. The recesses 4f, 5f are designed in such manner that a recess 4f of the first coupling member 4 and a recess 5f of the second coupling member 5 may combine as shown in FIG. 5 an as to form an aperture 15 sufficiently large to allow for access to the interior 14 of the coupling 1 and specifically for inserting the bolts 8 and/or 11 as well as corresponding fitting tools so that at least one of the coupling members 4 and 5 can be connected to the corresponding drive element 2 or 3 through the aperture 15.

Preferably, the recesses 4f, 5f are arranged in a regular pattern on the respective tube portions 4d, 5d around the axis of rotation A. In a first relative position of the first coupling member 4 and the second coupling member 5 the recesses 4f of the first coupling member 4 face the recesses 5f of the second coupling member 5 so that several apertures 15 for access to the interior 14 of the coupling 1 are formed.

Operating the coupling 1 in this first relative position would require substantially thicker tube portions 4d, 5d to avoid buckling of the tube portions 4d and 5d. However, in the present invention the second flange portions 4c, 5c may still have a larger wall thickness than the tube portions 4d, 5d.

Figure 3:
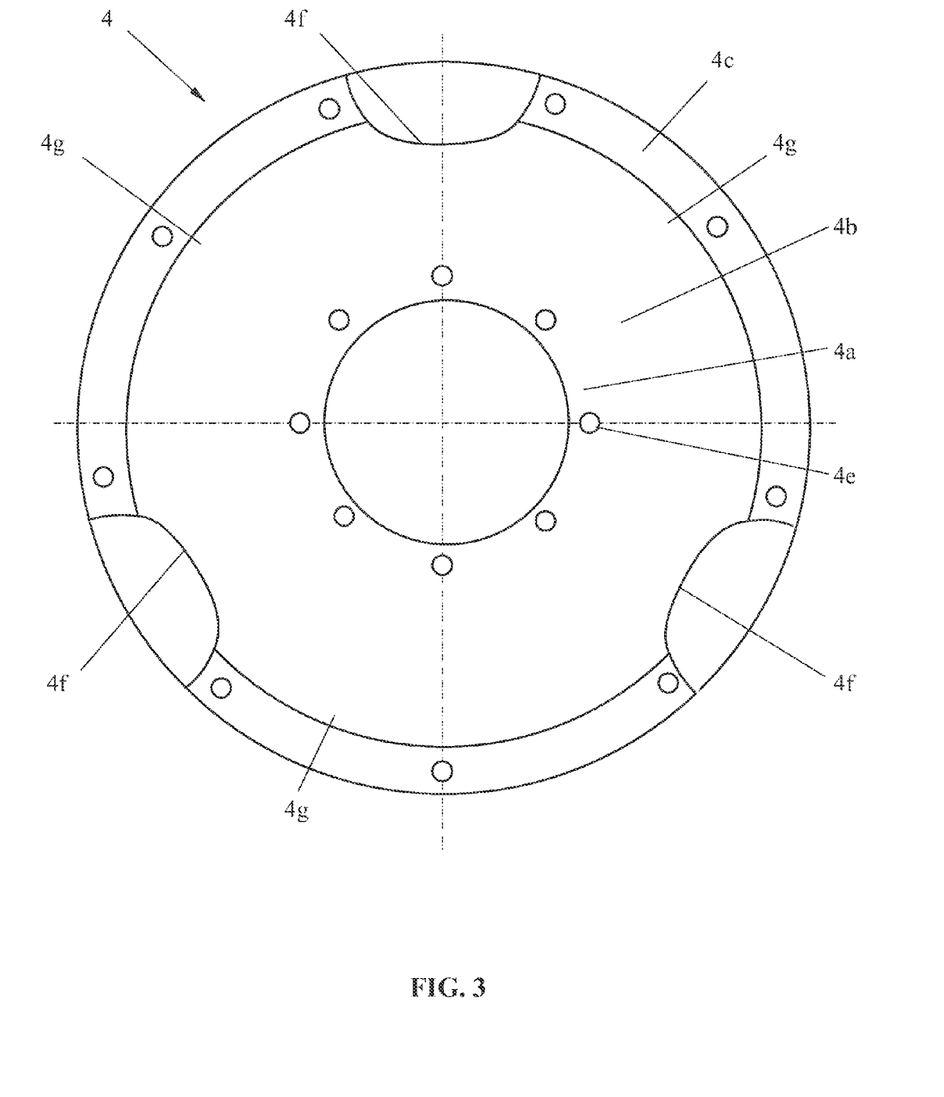
FIG. 3 is a view of the interior side of the first coupling member.
Figure 4A:
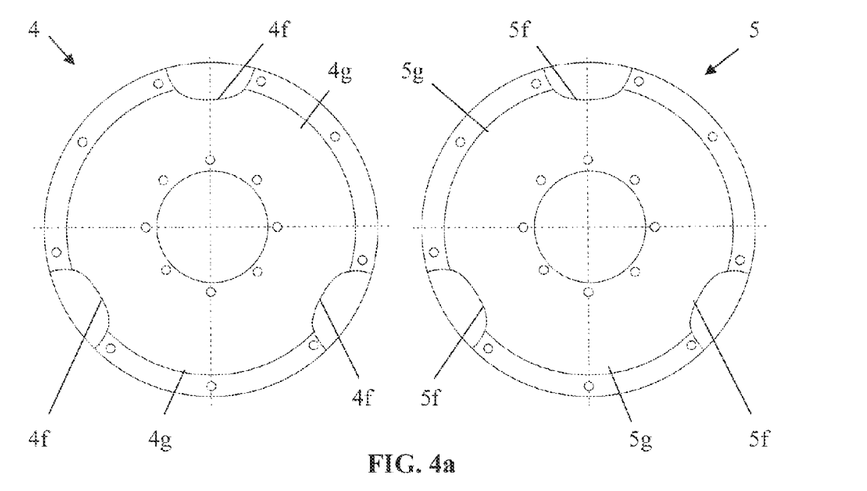
FIG. 4a shows a first relative position of the coupling members in an assembly mode of the coupling.
Figure 4B:
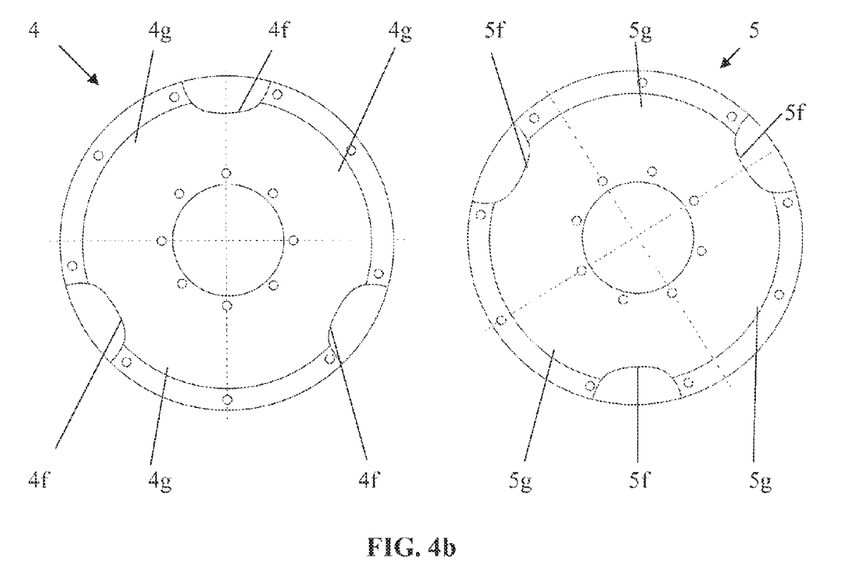
FIG. 4b shows a second relative position of the coupling members in an operational mode of the coupling.

According to the present invention, the coupling 1, as shown in FIG. 3, assumes the first relative position as shown in FIG. 4a only during assembly and disassembly. In the operational mode, i.e. in a second relative position as shown in FIG. 4b, which is obtained from the first relative position by rotating the first drive element 2 and the second drive element 3 against each other by less than one complete revolution, the recesses 4f, 5f of the first coupling member 4 and of the second coupling member 5 are offset in circumferential direction so as to face the non-recessed portions 4g, 5g of the other coupling member 4, 5, respectively. In other words, recesses 4f of the first coupling member 4 face the non-recessed portions 5g of the second coupling member 5 while recesses 5f of the second coupling member 5 face the non-recessed portions 4g of the first coupling member 4. In that second relative position the remaining apertures may be smaller than required for access to the interior 14 for the above-mentioned purposes. However, this offset of the recesses 4f, 5f significantly enhances buckling safety and torsional stiffness so that torque transmission and material usage are not impaired by recesses 4f, 5f.

The recesses 4f on the first coupling member 4 and the recesses 5f on the second coupling member 5 are arranged in equal patterns, respectively. These two patterns are circumferentially offset in the operational mode of the coupling 1 as shown in FIG. 4b.

Recesses 4f, 5f and non-recessed portions 4g, 5g are arranged alternately in circumferential direction on each of the coupling members 4, 5. The recesses 4f of the first coupling member 4 open axially towards to second coupling member 5 while the recesses 5f of the second coupling member 5 open towards the first coupling member 4. The second flange portions 4c, 5c, which extend radially outwardly from the tube portions 4d, 5d, are interrupted by the recesses 4f, 5f in circumferential direction.

As shown e.g. in FIG. 1 the recesses 4f on the first coupling member 4 extend between neighboring connecting members 6, respectively, and are each bridged by a non-recessed portion 5g on the second coupling member 5, which extends between the corresponding neighboring connecting elements 6. In the same way the recesses 5f on the second coupling member 5 are bridged by non-recessed portions 4g of the first coupling member 4. In this way, the second flange portions 4c, 5c partly overlap each other in axial direction, i.e. a portion of the front face of the second flange portion 4c of the first coupling member 4 faces a portion of the front face of the second flange portion 5c of the second coupling member 5. Connections between the two coupling members 4 and 5 is made at these axially overlapping portions of the second flange portions 4c, 5c by a plurality of coupling members 6, e.g. nuts and bolts. The torque flow thus runs through the non-recessed portions 4g, 5g and runs past the recesses 4f, 5f. Accordingly, the torque meanders along the non-recessed portions 4g, 5g and the corresponding overlapping solid parts of the second flange portions 4c, 5c thereby avoiding buckling of the tube portions 4d, 5d.

Figure 6:
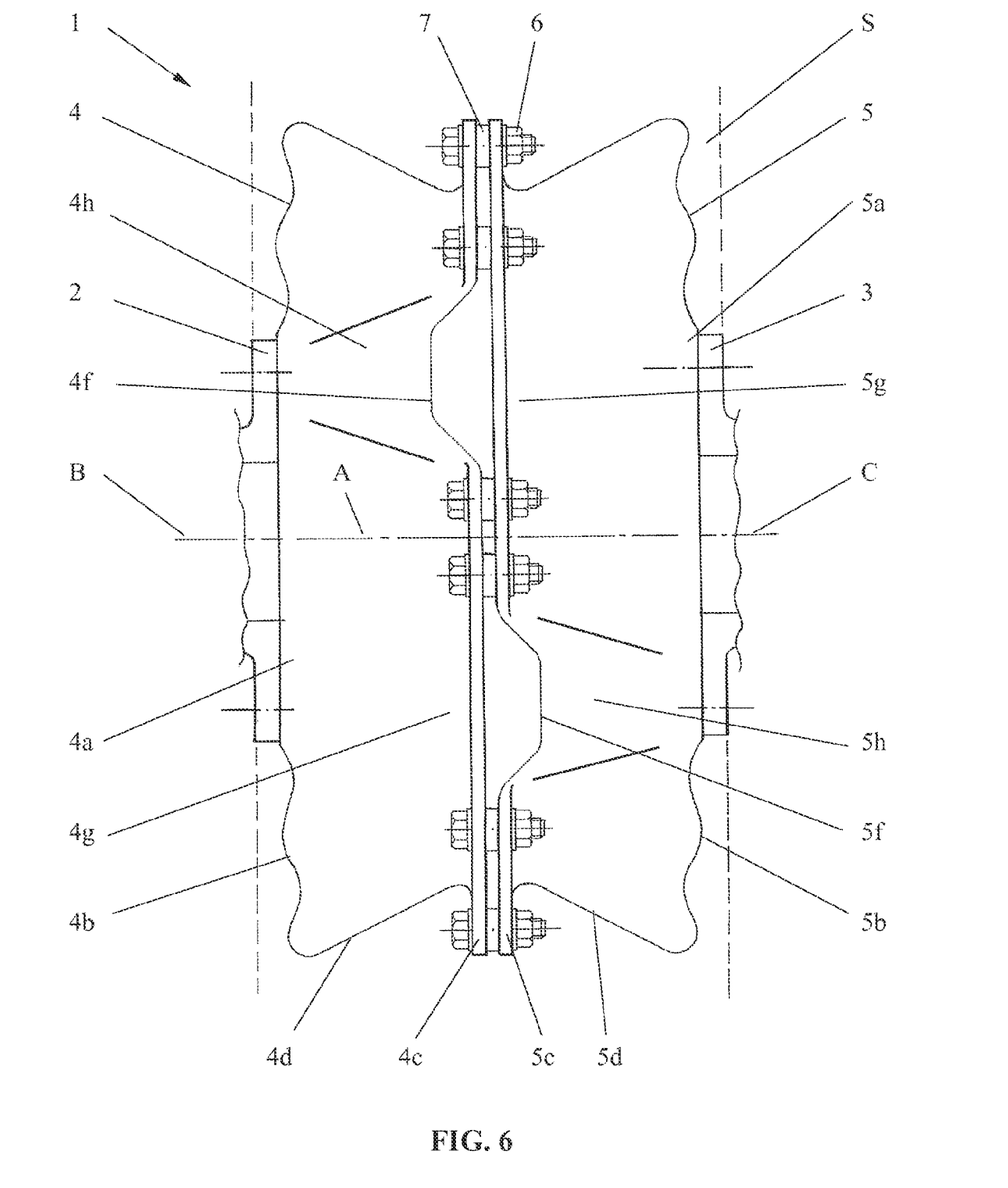
FIG. 6 shows a modification of the coupling having bulges at the tube portions.

In a modification of the embodiment as described above the tube portions 4d, 5d can be formed with bulges 4h, 5h that bulge inwardly or outwardly, i.e. form concavities or convexities as shown in FIG. 6. The bulges 4h, 5h are arranged around the tube portions 4d, 5d preferably at equal distances and the recesses 4f, 5f are positioned in the bulges 4h, 5h, respectively. This may increase budding safety.

In the embodiment as described above the recesses 4f, 5f may have circumferential edge portions 4i, 5i that are inclined to the circumferential direction at an inclination angle α. This inclination angle α has an absolute value within a range of 40° to 50° to reduce shear stresses around the recesses 4f, 5f. However, in another modification of the embodiment as described above the recesses 4f, 5f may be semicircular in shape or even have other shapes.

Assembly of the afore-described coupling 1 in the installation space S may be performed as follows. The installation space S is limited by the first drive element 2 and the second drive element 3 as well as by corresponding support structures indicated by the broken lines in FIG. 1. At the beginning of assembly, the first coupling member 4, the second coupling member 5 and the connecting elements 6 are disconnected and separate from each other.

In a first step the first coupling member 4 is attached to the first drive element 2 by connecting the first flange portion 4a to the first drive element 2. Since the second coupling member 5 is not yet in its position for assembly the first coupling member 4 can be easily mounted on the first drive element 2 from the side of the first coupling member 4 that faces the second drive element 3. In the present embodiment, the first flange portion 4a is fitted on the recess 10 of the first drive element 2 and fastened by the bolts 8.

In a second step the second coupling member 5 is inserted radially between the first coupling member 4 and the second drive element 3 so that the recesses 4f, 5f of the first coupling member 4 and the second coupling member 5 face each other.

Then, the second coupling member 5 is attached to the second drive element 3 by accessing the first flange portion 5a of the second coupling member 5 though the apertures 15 formed by opposite recesses 4f, 5f of the first and second coupling members 4, 5. In the present embodiment the bolts 11 are inserted through these apertures and screwed into the screw holes 12, thereby connecting the first flange portion 5a of the second coupling member 5 to the second drive element 3.

Subsequently, the first and second drive elements 4 and 5 are rotated relative to each other to offset the recesses 4f, 5f in circumferential direction so that the recesses 4f, 5f face the non-recesses portions 4g, 5g. In this second relative position the second flange portions 4c, 5c of the first and second coupling member 4, 5 are connected with each other by the connecting elements 6 upon which the coupling 1 is ready for operation.

The coupling 1 as described above provides a high compensation potential in relation to its axial length without impairing torque transmission or increasing material usage. It has a high buckling safety and high torsional stiffness.

The invention has been described in detail on the basis of one certain embodiment and modifications. It is, however, not limited to this embodiment and its modifications but rather encompasses all embodiments as defined by the claims.

What is claimed is:

1. A coupling comprising:
a first coupling member made in one piece from fibre composite material and having a first flange portion for attachment to a first drive element, a diaphragm portion that extends radially outwardly from the first flange portion, a second flange portion and a tube portion extending from an outer circumference of the diaphragm portion to the second flange portion;
a second coupling member made in one piece from fibre composite material and having a first flange portion for attachment to a second drive element, a diaphragm portion that extends radially outwardly from the first flange portion, a second flange portion and a tube portion extending from an outer circumference of the diaphragm portion to the second flange portion; and
connecting elements connecting the first coupling member and the second coupling member at their second flange portions;
wherein the diaphragm portions are configured to compensate axial or radial displacement of the axes of rotation of the first and second coupling members and are spaced apart from each other in axial direction by the tube portions;
wherein each of the tube portions has two or more recesses that are spaced from each other in circumferential direction by non-recessed portions and are remote from the diaphragm portions;
wherein the recesses are arrangeable in such manner that in a first relative position of the first coupling member and the second coupling member the recesses of the first coupling member face the recesses of the second coupling member so as to form together apertures for access to an interior of the coupling, and in a second relative position the recesses of the first coupling member and of the second coupling member are offset in circumferential direction and face the non-recessed portions, respectively.

2. The coupling of claim 1, wherein the second flange portions extend radially outwardly and are interrupted by the recesses in circumferential direction.

3. The coupling of claim 1, wherein the recesses on the first coupling member extend between neighbouring connecting elements, respectively, and are each bridged by a non-recessed portion on the second coupling member, wherein the non-recessed portions extend between the corresponding neighbouring connecting elements, respectively.

4. The coupling of claim 1, wherein the first and second coupling members are symmetric to each other.

5. The coupling of claim 1, wherein the first and second coupling members are identical in shape as regards at least the diaphragm portions, the tube portions and the second flange portions.

6. The coupling of claim 1, wherein the recesses on the first coupling member and on the second coupling member are arranged in equal patterns, said patterns being circumferentially offset in an operational mode of the coupling.

7. The coupling of claim 1, wherein the tube portions are formed with bulges that bulge inwardly or outwardly and the recesses are arranged at the bulges, respectively.

8. The coupling of claim 1, wherein the recesses of one of the first and second coupling members open axially towards the other of the first and second coupling members.

9. The coupling of claim 1, wherein the recesses have circumferential edge portions that are inclined to the circumferential direction at an inclination angle, said inclination angle having an absolute value within a range of 40° to 50°.

10. The coupling of claim 1, wherein the second flange portions have a larger wall thickness than the tube portions.

11. The coupling of claim 1, wherein second flange portions of the first and second coupling member partly overlap each other in axial direction and connection between the coupling member is made at these overlapping portions of the second flange portions.

12. The coupling of claim 1, wherein a portion of a front face of the second flange portion of the first coupling member faces a portion of a front face of the second flange portion of the second coupling member and connection between the two coupling members is made at these front face portions of the second flange portions.

13. The coupling of claim 1, wherein the diaphragm portions are annular in shape and extend in a radial plane.

14. The coupling of claim 1, wherein a portion of a front face of the second flange portion of the first coupling member faces a portion of a front face of the second flange portion of the second coupling member and connection between the two coupling members is made at these front face portions of the second flange portions;
wherein the recesses on the first coupling member extend between neighbouring connecting elements, respectively, and are each bridged by a non-recessed portion on the second coupling member, wherein the non-recessed portions extend between the corresponding neighbouring connecting elements, respectively; and
wherein the connecting elements include bolts, each bolt extending through the second flange portions of both coupling members.

15. The coupling of claim 14, wherein the tube portions are formed with bulges that bulge inwardly or outwardly and the recesses are arranged at the bulges, respectively.

16. The coupling of claim 14, wherein the recesses have circumferential edge portions that are inclined to the circumferential direction at an inclination angle, said inclination angle having an absolute value within a range of 40° to 50°.

17. The coupling of claim 14, wherein the diaphragm portions are annular in shape and extend in a radial plane.

18. A drive shaft comprising
a first drive element;
a second drive element; and
a coupling drivingly connecting the first drive element and the second drive element;
wherein the coupling includes:

a first coupling member made in one piece from fibre composite material and having a first flange portion for attachment to the first drive element, a diaphragm portion that extends radially outwardly from the first flange portion, a second flange portion and a tube portion extending from an outer circumference of the diaphragm portion to the second flange portion;
a second coupling member made in one piece from fibre composite material and having a first flange portion for attachment to the second drive element, a diaphragm portion that extends radially outwardly from the first flange portion, a second flange portion and a tube portion extending from an outer circumference of the diaphragm portion to the second flange portion; and
connecting elements connecting the first coupling member and the second coupling member at their second flange portions;
wherein the diaphragm portions are configured to compensate axial or radial displacement of the axes of rotation of the first and second coupling members and are spaced apart from each other in axial direction by the tube portions;
wherein each of the tube portions has two or more recesses that are spaced from each other in circumferential direction by non-recessed portions and are remote from the diaphragm portions;
wherein the recesses are arrangeable in such manner that in a first relative position of the first coupling member and the second coupling member the recesses of the first coupling member face the recesses of the second coupling member so as to form together apertures for access to an interior of the coupling, and in a second relative position the recesses of the first coupling member and of the second coupling member are offset in circumferential direction and face the non-recessed portions, respectively.

19. A method of mounting a coupling in a limited space between a first drive element and a second drive element, wherein the coupling includes:
a first coupling member made in one piece from fibre composite material and having a first flange portion for attachment to a first drive element, a diaphragm portion that extends radially outwardly from the first flange portion, a second flange portion and a tube portion extending from an outer circumference of the diaphragm portion to the second flange portion;
a second coupling member made in one piece from fibre composite material and having a first flange portion for attachment to a second drive element, a diaphragm portion that extends radially outwardly from the first flange portion, a second flange portion and a tube portion extending from an outer circumference of the diaphragm portion to the second flange portion; and
connecting elements for connecting the first coupling member and the second coupling member at their second flange portions;
wherein the annular diaphragm portions are configured to compensate axial or radial displacement of the axes of rotation of the first and second coupling members and are spaced apart from each other in axial direction by the tube portions;
wherein each of the tube portions has two or more recesses that are spaced from each other in circumferential direction by non-recessed portions;
the method comprising:
attaching the first coupling member to the first drive element by connecting the first flange portion of the first coupling member to the first drive element through access from the side of the first coupling member, which faces the second drive element, inserting the second coupling member between the first coupling member and the second drive element so that the recesses of the first coupling member and the second coupling member face each other, attaching the second coupling member to the second drive element by accessing the first flange of the second coupling member via apertures formed by opposite recesses of the first and second coupling member and connecting the first flange portion of the second coupling member to the second drive element, and rotating the first and second drive element relative to each other to offset the recesses in circumferential direction and subsequently connecting the second flange portions of the first coupling member and the second flange portions of the second coupling member with each other.

\* \* \* \* \*